(12) United States Patent
Indiresan et al.

(10) Patent No.: US 11,502,872 B1
(45) Date of Patent: Nov. 15, 2022

(54) ISOLATION OF CLIENTS WITHIN A VIRTUAL LOCAL AREA NETWORK (VLAN) IN A FABRIC NETWORK

(71) Applicant: Cisco Technology, Inc., San Jose, CA (US)

(72) Inventors: Atri Indiresan, Sunnyvale, CA (US); Ramchander Rao Nadipally, San Ramon, CA (US); Rahul Kachalia, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/481,856

(22) Filed: Sep. 22, 2021

Related U.S. Application Data

(60) Provisional application No. 63/197,703, filed on Jun. 7, 2021.

(51) Int. Cl.
*H04L 12/46* (2006.01)
*H04L 9/40* (2022.01)

(52) U.S. Cl.
CPC ...... *H04L 12/4633* (2013.01); *H04L 12/4675* (2013.01); *H04L 63/029* (2013.01)

(58) Field of Classification Search
CPC ............. H04L 12/4633; H04L 12/4675; H04L 63/029
See application file for complete search history.

(56) References Cited

U.S. PATENT DOCUMENTS

| | | | | |
|---|---|---|---|---|
| 8,369,344 | B1 * | 2/2013 | Krishnan | H04L 63/0236 370/389 |
| 11,038,761 | B2 * | 6/2021 | Stiff | H04L 12/4641 |
| 2007/0192862 | A1 | 8/2007 | Vermeulen et al. | |
| 2014/0241353 | A1 * | 8/2014 | Zhang | H04L 45/74 370/392 |
| 2014/0362846 | A1 * | 12/2014 | Li | H04L 12/4633 370/338 |
| 2015/0124809 | A1 * | 5/2015 | Edsall | H04L 47/32 370/390 |
| 2015/0372870 | A1 * | 12/2015 | Stiff | H04L 41/0893 370/338 |
| 2019/0349404 | A1 | 11/2019 | Jain et al. | |
| 2020/0099659 | A1 * | 3/2020 | Cometto | H04L 63/0263 |
| 2020/0106745 | A1 | 4/2020 | Glazemakers et al. | |
| 2021/0021572 | A1 | 1/2021 | Bonczar | |
| 2022/0078219 | A1 * | 3/2022 | D'Amato | H04L 65/65 |

FOREIGN PATENT DOCUMENTS

CN 109194640 A 1/2019

* cited by examiner

*Primary Examiner* — Mohamed A. Wasel
(74) *Attorney, Agent, or Firm* — Merchant & Gould P.C.

(57) ABSTRACT

Client device blocking may be provided. A switching device may receive data from a first client device. The data may be addressed to a second client device. Then it may be determined that both the first client device and the second client device belong to a protected group. Next, in response to determining that both the first client device and the second client device belong to the protected group, the data may be blocked from being forwarding to the second client device on a network interface of the switching device.

20 Claims, 3 Drawing Sheets

US 11,502,872 B1

ISOLATION OF CLIENTS WITHIN A VIRTUAL LOCAL AREA NETWORK (VLAN) IN A FABRIC NETWORK

RELATED APPLICATION

Under provisions of 35 U.S.C. § 119(e), Applicant claims the benefit of U.S. Provisional Application No. 63/197,703, filed Jun. 7, 2021, which is incorporated herein by reference.

TECHNICAL FIELD

The present disclosure relates generally to isolation of clients within a Virtual Local Area Network (VLAN) in a fabric network.

BACKGROUND

A computer network or data network is a telecommunications network that allows computers to exchange data. In computer networks, networked computing devices exchange data with each other using a data link. The connections between computers are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

An enterprise fabric network may use a network overlay, which is a virtual network of interconnected nodes that share an underlying physical network. Examples of network overlays include Virtual Extensible Local Area Network (VXLAN), Network Virtualization Using Generic Routing Encapsulation (NVGRE), Transparent Interconnection of Lots of Links (TRILL), and Location/Identifier Separation Protocol (LISP).

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
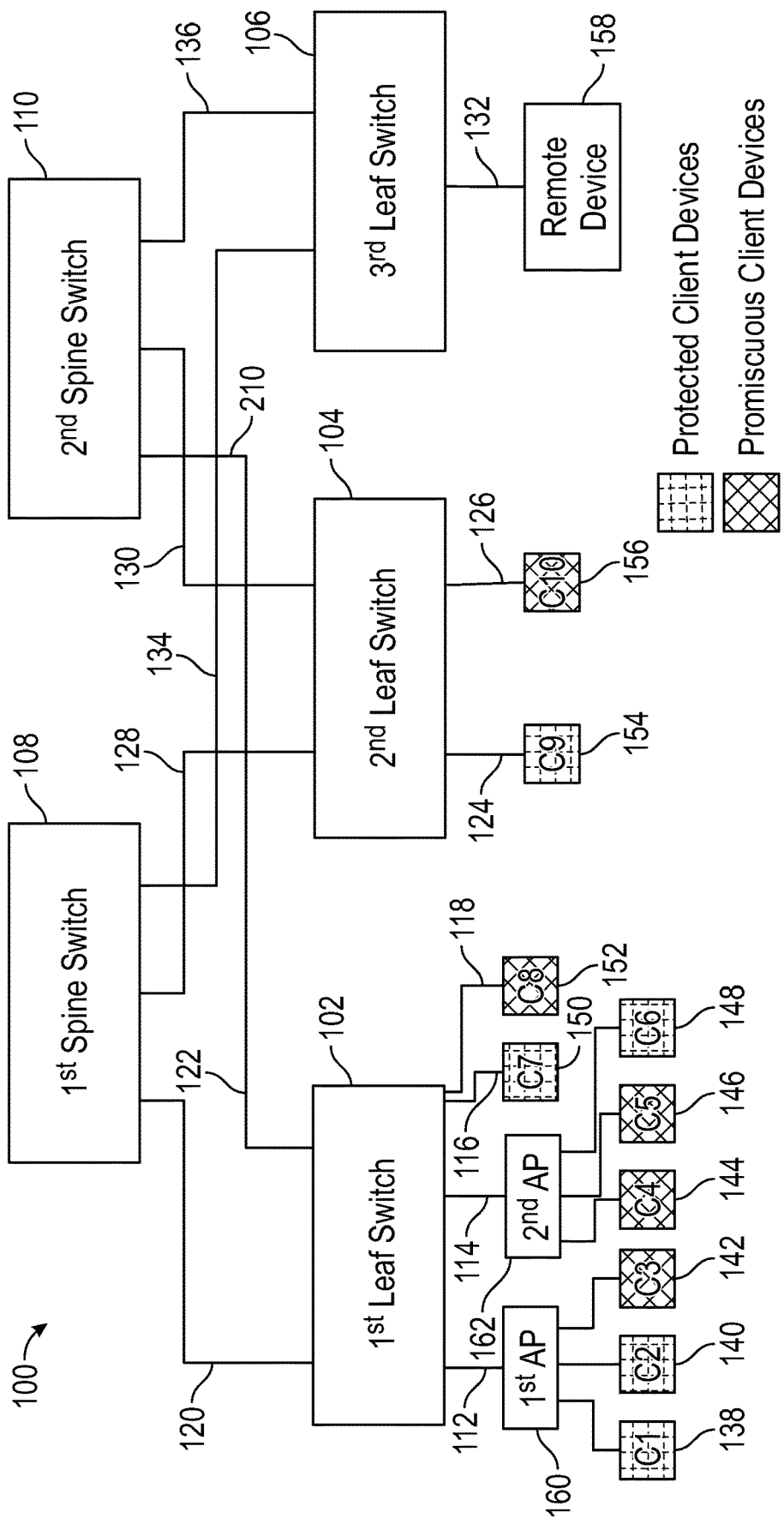
FIG. 1 is a block diagram of an operating environment for providing client device blocking.

Client device blocking may be provided. A switching device may receive data from a first client device. The data may be addressed to a second client device. Then it may be determined that both the first client device and the second client device belong to a protected group. Next, in response to determining that both the first client device and the second client device belong to the protected group, the data may be blocked from being forwarding to the second client device on a network interface of the switching device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Monitoring traffic may be a common firewall function, and for this, firewalls may be connected to an Internet gateway to monitor traffic entering and leaving an enterprise. The firewall may be at a border of an untrusted (e.g., external) and trusted (internal) network. However, in some networks, it may be common for untrusted devices to directly access the network (e.g., cell phones, Bring Your Own Device (BYOD), etc.), so devices in the trusted part of the network may also need to be monitored. In order to monitor, it may be necessary to isolate the traffic from such devices and regulate any traffic, often at the granularity of an individual application or session. In particular, there may be situations where multiple devices share a protected (i.e., isolated) Virtual Local Area Network (VLAN), but traffic between them may be monitored and regulated by a firewall and hence they may not be permitted to communicate directly amongst themselves. On the other hand, devices on a promiscuous VLAN may communicate amongst themselves without a firewall. These VLANs (i.e., protected and promiscuous) may be a part of a fabric network, for example, a Virtual Extensible LAN (VxLAN) (e.g., Border Gateway Protocol (BGP)-Ethernet Virtual Private Network (EVPN) or Software Defined Access), a Virtual Private LAN Service (VPLS), etc.

FIG. 1 is a block diagram of an operating environment for providing client device blocking including a network 100. As shown in FIG. 1, network 100 may comprise a plurality of switches comprising, but is not limited to, a first leaf switch 102, a second leaf switch 104, a third leaf switch 106, a first spine switch 108 and a second spine switch 110. The plurality of switches may comprise any type of networking devices (e.g., switches, routers, etc.) capable of routing data packets through network 100.

First leaf switch 102 may comprise a first leaf switch first network interface 112, a first leaf switch second network interface 114, a first leaf switch third network interface 116, and a first leaf switch fourth network interface 118, all of which may connect to devices outside network 100. First leaf switch 102 may further comprise a first leaf switch first fabric interface 120 and a first leaf switch second fabric interface 122, both of which may connect to devices inside network 100 such as first spine switch 108 and second spine switch 110.

Second leaf switch 104 may comprise a second leaf switch first network interface 124 and a second leaf switch second network interface 126, both of which may connect to devices outside network 100. Second leaf switch 104 may further comprise a second leaf switch first fabric interface 128 and a second leaf switch second fabric interface 130, both of which may connect to devices inside network 100 such as first spine switch 108 and second spine switch 110.

Third leaf switch 106 may comprise a third leaf switch first network interface 132 that may connect to devices outside network 100. Third leaf switch 106 may further comprise a third leaf switch a first fabric interface 134 and a third leaf switch second fabric interface 136, both of which may connect to devices inside network 100 such as first spine switch 108 and second spine switch 110.

The aforementioned network interfaces may correspond to ports on their respective leaf switches that may connect to devices outside network 100. The aforementioned fabric interfaces may correspond to ports on their respective leaf switches that may connect to devices inside network 100. The aforementioned fabric interfaces may comprise, but are not limited to, physical interfaces directed inside network 100 than their respective leaf switch or a tunnel interface directed inside network 100 than their respective leaf switch. Consistent with embodiments of the disclosure, data traffic on the aforementioned fabric interfaces may not be blocked. Specifically, data traffic associated with client devices in a protected group (i.e., in a protected Virtual Local Area Network (VLAN)) may not be blocked. Consistent with embodiments of the disclosure a tunnel may comprise of a logical interface with one or more hops across the network fabric. The fabric may be VxLAN, VPLS, LISP, Generic Routing Encapsulation (GRE) or similar.

A plurality of devices may communicate over network 100. The plurality of client devices may comprise, but are not limited to, a first client device 138, a second client device 140, a third client device 142, a fourth client device 144, a fifth client device 146, a sixth client device 148, a seventh client device 150, an eighth client device 152, a ninth client device 154, a tenth client device 156, and a remote device 158. Ones of the plurality of devices may comprise, but are not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Remote device 158 may comprise, but is not limited to, a gateway to the Internet, a device on the Internet, an email server, or a firewall. Remote device 158 may be attached to the network in different locations and is not limited to being attached to third leaf switch 106.

As will be described in greater detail below and consistent with embodiments of the disclosure, first client device 138, second client device 140, sixth client device 148, seventh client device 150, and ninth client device 154 may be part of a protected group (i.e., placed in a protected Virtual Local Area Network (VLAN)) while third client device 142, fourth client device 144, fifth client device 146, eighth client device 152, and a tenth client device 156 may not be part of a protected group (i.e., placed in a promiscuous VLAN).

Some of the plurality of devices may communicate wirelessly, for example, over a plurality of Access Points (APs) comprising, but not limited to, a first AP 160 or a second AP 162. First AP 160 and second AP 162 may be compatible with wireless specification standards such as, but not limited to, the Institute of Electrical and Electronics Engineers (IEEE) 802.11 specification standard for example.

First client device 138, second client device 140, third client device 142, fourth client device 144, fifth client device 146, sixth client device 148, seventh client device 150, and eighth client device 152 may connect to network 100 via first leaf switch 102. First client device 138, second client device 140, and third client device 142 may attach to first AP 160 that my connect to first leaf switch 102 via first leaf switch first network interface 112. Fourth client device 144, fifth client device 146, and sixth client device 148 may attach to second AP 162 that my connect to first leaf switch 102 via first leaf switch second network interface 114. Seventh client device 150 and eighth client device 152 may connect to first leaf switch 102 via first leaf switch third network interface 116 and first leaf switch fourth network interface 118 respectively. Ninth client device 154 and tenth client device 156 may connect to second leaf switch 104 via second leaf switch first network interface 124 and second leaf switch second network interface 126 respectively. Remote device 158 may connect to third leaf switch 106 via third leaf switch first network interface 132.

The elements described above of the aforementioned operating environment (e.g., plurality of switches, the plurality of devices, and the plurality of APs) may be practiced in hardware and/or in software (including firmware, resident software, micro-code, etc.) or in any other circuits or systems. The elements of the operating environment may be practiced in electrical circuits comprising discrete electronic elements, packaged or integrated electronic chips containing logic gates, a circuit utilizing a microprocessor, or on a single chip containing electronic elements or microprocessors. Furthermore, the elements of the operating environment may also be practiced using other technologies capable of performing logical operations such as, for example, AND, OR, and NOT, including but not limited to, mechanical, optical, fluidic, and quantum technologies. As described in greater detail below with respect to FIG. 3, the elements of the operating environment may be practiced in a computing device 300.

Network 100 may comprise an example network architecture. For example, network 100 may comprise, but is not limited to, a BGP-EVPN VxLAN fabric, though VPLS and other fabrics may also be used consistent with embodiments of the disclosure. Also, embodiments of the disclosure may be used in multi-vendor environments, may be configured on individual leaf switches, and may not depend on the implementation on other vendor devices in the network.

As stated above, some of the plurality of client devices may be in a protected (i.e., isolated) group or segment (e.g., VLAN) and others of the plurality of client devices may be in a promiscuous group or segment (e.g., VLAN). Both of these groups may be in the same Virtual Routing and Forwarding (VRF). For example, there may be just one protected group for each Layer 3 VRF, but there may multiple promiscuous groups per VRF. A group may be represented by a VLAN on any switch, and by a Virtual Network Identifier (VNI) in the VxLAN fabric.

All client devices may be connected to leaf (i.e., access) switches (i.e., first leaf switch 102 and second leaf switch 104), either directly, or via an intermediate switch or wireless AP. The directly connected client devices may be on access ports, and the indirectly connected clients may be on trunk ports. The firewall or firewalls may be on one or more border leaf switches (e.g., third leaf switch 106).

Consistent with embodiments of the disclosure, the forwarding rules may comprise: i) between clients in the protected (i.e., isolated) group, data packets may be dropped and the firewall may determine if they ultimately get to their destination; ii) between clients in a promiscuous group, data packets may be directly sent to their destination; and iii) between clients in different groups (protected or promiscuous), data packets may be dropped and the firewall may determine if they ultimately get to their destination.

Embodiments of the disclosure may solve the problem of how to prevent two client devices in a protected group (e.g., VLAN) on the same leaf switch from communicating directly. For example, if first client device 138 were to flood an Address Resolution Protocol (ARP) packet, in general, it would be visible to second client device 140, sixth client device 148, and seventh client device 150, since they may be on the same VLAN. To prevent this from happening, embodiments of the disclosure may configure the protected (e.g., isolated) segment, either by marking the VLAN as isolated, or the Ethernet Virtual Instance (EVI) as isolated. In other words, there may be a one-to-one relationship between VLAN and EVI, with the VLAN expressed on the switches, and EVI in the fabric for example. When a VLAN/EVI is marked as isolated: i) all physical ports in a protected (i.e., isolated) VLAN may be marked protected (access or trunk); ii) the logical ports corresponding to VxLAN tunnels may be not marked protected; and iii) protected (i.e., isolated) VLANs may be marked as isolated.

Figure 2:
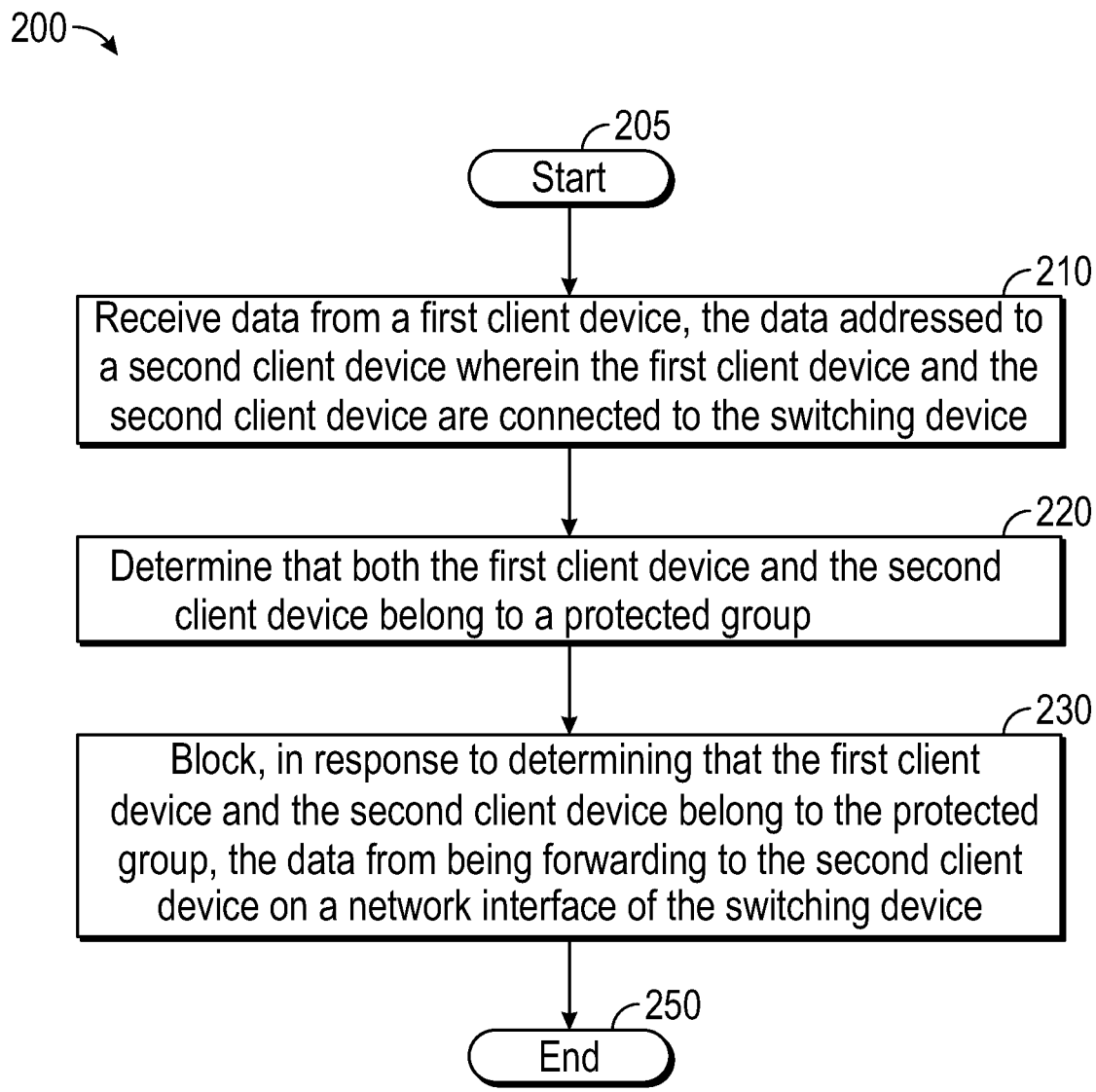
FIG. 2 is a flow chart of a method for providing client device blocking.

FIG. 2 is a flow chart setting forth the general stages involved in a method 200 consistent with an embodiment of the disclosure for providing client device blocking. Method 200 may be implemented using a first leaf switch 102 as described in more detail above with respect to FIG. 1. Ways to implement the stages of method 200 will be described in greater detail below.

Method 200 may begin at starting block 205 and proceed to stage 210 where first leaf switch 102 may receive data from first client device 138. The data may be addressed to second client device 140. For example, first client device 138 may send a data packet, via first AP 160, to first leaf switch 102 on first leaf switch first network interface 112.

From stage 210, where first leaf switch 102 receives data from first client device 138, method 200 may advance to stage 220 where first leaf switch 102 may determine that both first client device 138 and second client device 140 belong to a protected group. For example, first leaf switch 102 may examine the data packet and determine that the data packet came from a client device in a protected group and/or is addressed to a client device that is in the protected group. In other words, the determination may be made by looking at the property of the source and destination interface. i.e., if the packet comes from a protected interface, and the destination is also protected, the packet is dropped. The fabric/tunnel interfaces may not be marked as protected, and hence, that traffic will pass. In this example, both first client device 138 and second client device 140 belong to the protected group. For the destination, data as to whether a client device is in a protected group may be stored in a routing table or other database and may be queried by first leaf switch 102 via an address associated with the client device. For the source, it may be know where it came from. Then, a forwarding lookup for the destination may be done, and from this it may be determined if it is going to a protected or non-protected interface.

Once first leaf switch 102 determines that both first client device 138 and second client device 140 belong to the protected group in stage 220, method 200 may continue to stage 230 where first leaf switch 102 may block, in response to determining that both first client device 138 and second client device 140 device belongs to the protected group, the data from being forwarding to second client device 140 on first leaf switch first network interface 112 of first leaf switch 102. For example, because first leaf switch 102 determined that the data packet either came from a client device in a protected group (e.g., first client device 138) and is addressed to a client device that is in the protected group (e.g., second client device 140), first leaf switch 102 may block the data packet from being transmitted back out on first leaf switch first network interface 112 to second client device 140.

If the aforementioned data packet were addressed to ninth client device 154, the packet will be forced to go to leaf switch 106, where the firewall may determine whether to drop the packet. Furthermore, if the data packet were addressed to a client device in the promiscuous group, the packet will be forced to go to leaf switch 106, where the firewall may determine whether to drop the packet. However, data packets from client devices in a promiscuous group addressed to client devices in the same promiscuous group may not be blocked by first leaf switch 102 or second leaf switch 104. Once first leaf switch 102 blocks, in response to determining that both first client device 138 and second client device 140 device belongs to the protected group, the data from being forwarding to second client device 140 on first leaf switch first network interface 112 of first leaf switch 102 in stage 230, method 200 may then end at stage 240.

Continuing with the above example, first leaf switch 102 may receive a data packet from first client device 138 addressed to second client device 140. Because first leaf switch 102 determined that the data packet either came from a client device in a protected group (e.g., first client device 138) and is addressed to a client device that is in the protected group (e.g., second client device 140), first leaf switch 102 may block the data packet from being transmitted back out on first leaf switch first network interface 112 to second client device 140. However, first leaf switch 102 may not block the packet to or from first leaf switch first fabric interface 120 and first leaf switch second fabric interface 122. Traffic on any of the fabric interfaces in network 100 may not be blocked. Accordingly, the data packet may be forwarded through the network to third leaf switch 106.

From third leaf switch 106, the data packet may be forwarded to remote device 158. When remote device comprises a firewall, the firewall may examine the data packet and determine if the data packet should be sent to second client device 140 or not. If the firewall determines that the data packet should be sent to second client device 140, the firewall may forward the data packet back through network 100 to first leaf switch 102 that may in turn forward it to second client device 140. Accordingly, the firewall regulates the communication between client devices in the protected group.

In other embodiments of the disclosure, remote device 158 may comprise a gateway to the Internet or an email server. In these examples, the plurality of client devices in the protected group may be given access to the Internet or an enterprise email server via remote device 158.

Figure 3:
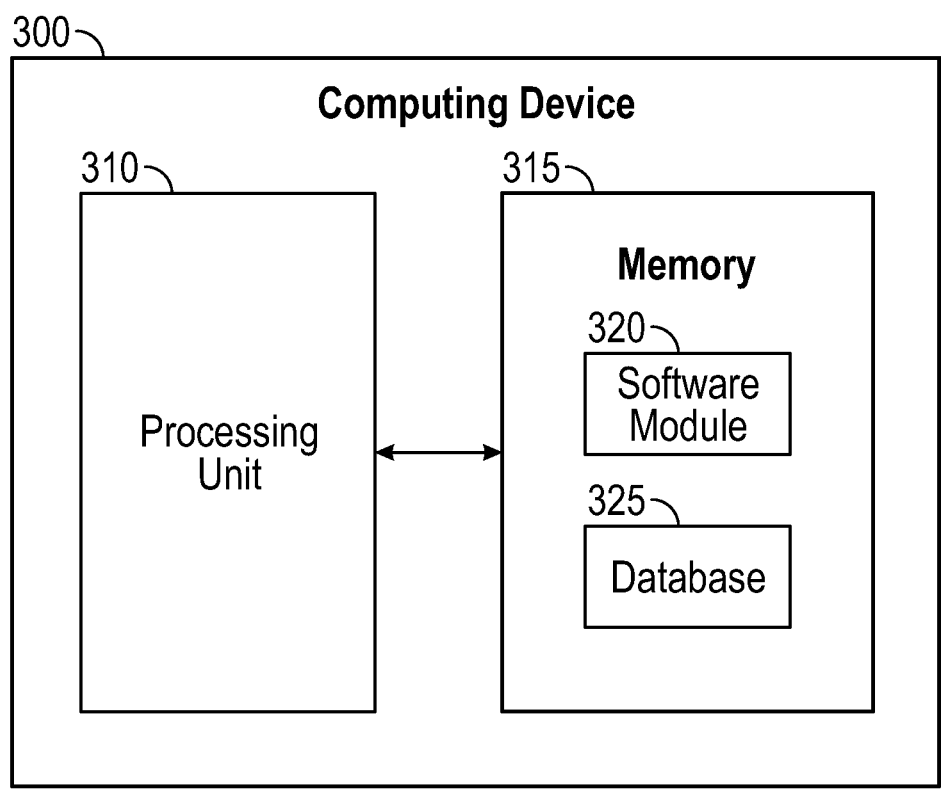
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes described above including providing client device blocking as described with respect to FIG. 2. Computing device 300, for example, may provide an operating environment for ones of the plurality of switches, the plurality of devices, or the plurality of APs. Ones of the plurality of switches, the plurality of devices, or the plurality of APs may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a switching device, data from a first client device, the data addressed to a second client device, wherein the first client device and the second client device are connected to the switching device;
    determining that both the first client device and the second client device belong to a protected group, wherein determining that both the first client device and the second client device belong to the protected group comprises determining that both the first client device and the second client device belong to a same Virtual Area Network expressed on the switching device and marked as protected; and blocking, in response to determining that both the first client device and the second client device belong to the same Virtual Area Network expressed on the switching device and marked as protected, the data from being forwarded to the second client device on a network interface of the switching device.

2. The method of claim 1, further comprising forwarding the data on a fabric interface to a remote device.

3. The method of claim 2, wherein forwarding the data on the fabric interface to the remote device comprises forwarding the data to the remote device through a tunnel.

4. The method of claim 2, wherein the remote device comprises one of an Internet gateway, a device on the Internet, an email server, and a firewall.

5. The method of claim 2, wherein the fabric interface comprises a tunnel interface directed across a network fabric.

6. The method of claim 2, further comprising:
receiving the data back on a tunnel interface from the remote device; and
forwarding, in response to receiving the data back from the remote device, the data to the second client device on the network interface.

7. The method of claim 1, wherein the switching device comprises a leaf switch.

8. The method of claim 1, wherein the protected group comprises a protected Virtual Local Area Network (VLAN) segment.

9. The method of claim 8, wherein other client devices are connected to the switching device and belong to a promiscuous group comprises a promiscuous Virtual VLAN segment different from the protected VLAN segment.

10. A system comprising:
a memory storage; and
a processing unit disposed in a switching device, the processing unit coupled to the memory storage, wherein the processing unit is operative to:
receive data from a first client device, the data addressed to a second client device wherein the first client device and the second client device are connected to the switching device;
determine that both the first client device and the second client device belong to a protected group, wherein the processing unit being operative to determine that both the first client device and the second client device belong to the protected group comprises the processing unit being operative to determine that both the first client device and the second client device belong to a same Virtual Area Network expressed on the switching device and marked as protected; and
block, in response to determining that the both first client device and the second client device belong to the same Virtual Area Network expressed on the switching device and marked as protected, the data from being forwarding to the second client device on a network interface of the switching device.

11. The system of claim 10, wherein the processing unit is further operative to forward the data on a fabric interface to a remote device.

12. The system of claim 11, wherein the processing unit being operative to forward the data on the fabric interface to the remote device comprises the processing unit being operative to forward the data to the remote device through a tunnel.

13. The system of claim 11, wherein the remote device comprises one of an Internet gateway, a device on the Internet, an email server, and a firewall.

14. The system of claim 11, wherein the protected group comprises a protected Virtual Local Area Network (VLAN) segment.

15. The system of claim 11, wherein the fabric interface comprise a tunnel interface directed across a network fabric.

16. The system of claim 11, wherein the processing unit is further operative to:
receive the data back on a tunnel interface from the remote device; and
forward, in response to receiving the data back from the remote device, the data to the second client device on the network interface.

17. A computer-readable medium that stores a set of instructions which when executed perform a method executed by the set of instructions comprising:
receiving, by a switching device, data from a first client device, the data addressed to a second client device wherein the first client device and the second client device are connected to the switching device;
determining that both the first client device and the second client device belong to a protected group, wherein determining that both the first client device and the second client device belong to the protected group comprises determining that both the first client device and the second client device belong to a same Virtual Area Network expressed on the switching device and marked as protected; and
blocking, in response to determining that both the first client device and the second client device belong to the same Virtual Area Network expressed on the switching device and marked as protected, the data from being forwarding to the second client device on a network interface of the switching device.

18. The computer-readable medium of claim 17, further comprising forwarding the data on a fabric interface to a remote device.

19. The computer-readable medium of claim 18, wherein the fabric interface comprises a tunnel interface directed across a network fabric.

20. The computer-readable medium of claim 18, further comprising:
receiving the data back on a tunnel interface from the remote device; and
forwarding, in response to receiving the data back from the remote device, the data to the second client device on the network interface.

* * * * *